(12) United States Patent
Lu et al.

(10) Patent No.: US 11,315,112 B2
(45) Date of Patent: Apr. 26, 2022

(54) BLOCKCHAIN DATA PROCESSING METHOD, APPARATUS, DEVICE, AND SYSTEM

(71) Applicant: Advanced New Technologies Co., Ltd., Grand Cayman (KY)

(72) Inventors: Xuming Lu, Hangzhou (CN); Hushen Wang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/405,616

(22) Filed: May 7, 2019

(65) Prior Publication Data

US 2019/0347653 A1 Nov. 14, 2019

(30) Foreign Application Priority Data

May 10, 2018 (CN) .......................... 201810443381.9

(51) Int. Cl.
*G06Q 20/06* (2012.01)
*G06Q 20/38* (2012.01)
(Continued)

(52) U.S. Cl.
CPC ......... *G06Q 20/389* (2013.01); *G06Q 20/065* (2013.01); *G06Q 20/22* (2013.01);
(Continued)

(58) Field of Classification Search
CPC ............. G06Q 20/389; G06Q 20/3825; G06Q 20/3829; G06Q 2220/00; H04L 9/0637; H04L 9/30; H04L 9/3247; H04L 2209/38
See application file for complete search history.

(56) References Cited

U.S. PATENT DOCUMENTS 5,892,900 A * 4/1999 Ginter .................... G06F 21/10
726/26
10,102,265 B1 10/2018 Madisetti et al.
(Continued)

FOREIGN PATENT DOCUMENTS

CA 3030813 4/2018
CN 101253725 8/2008
(Continued)

OTHER PUBLICATIONS

Menezes, A. J., Oorschot, P. C., & Vanstone, S. A. (1997). Handbook of Applied Cryptography, doi: 10.1201/9780429466335 (Year: 1997).*

(Continued)

*Primary Examiner* — John W Hayes
*Assistant Examiner* — Dennis G Keritsis
(74) *Attorney, Agent, or Firm* — Fish & Richardson P.C.

(57) ABSTRACT

Implementations of the present specification disclose a blockchain data processing method, apparatus, device, and system. A request for transitioning a state of a contract stored at a blockchain system is received at a plurality of blockchain nodes of the blockchain system. The request includes signature data of at least one state participant of the contract. The contract is associated with a pre-determined number of participants. The signature data is verified at a blockchain node. The verification is based on at least one public key corresponding to the at least one state participant. A determination is made whether the signature data of the at least one state participant is verified. In response to determining that the signature data of the at least one state participant is verified, a new contract state defined in the request is confirmed. The pre-determined number of participants is pre-determined in the contract.

9 Claims, 7 Drawing Sheets

(51) Int. Cl.
*H04L 9/06* (2006.01)
*H04L 9/30* (2006.01)
*H04L 9/32* (2006.01)
*G06Q 50/18* (2012.01)
*G06Q 20/22* (2012.01)

(52) U.S. Cl.
CPC ..... *G06Q 20/3825* (2013.01); *G06Q 20/3829* (2013.01); *G06Q 50/18* (2013.01); *H04L 9/0637* (2013.01); *H04L 9/30* (2013.01); *H04L 9/3247* (2013.01); *G06Q 2220/00* (2013.01); *H04L 2209/38* (2013.01)

(56) References Cited

U.S. PATENT DOCUMENTS

| | | | |
|---|---|---|---|
| 10,204,148 | B2 | 2/2019 | Madisetti et al. |
| 10,255,342 | B2 | 4/2019 | Madisetti et al. |
| 10,567,174 | B2 | 2/2020 | Wang et al. |
| 10,581,610 | B2 | 3/2020 | Wang et al. |
| 2017/0243193 | A1 | 8/2017 | Manian et al. |
| 2017/0287090 | A1 | 10/2017 | Hunn et al. |
| 2017/0345011 | A1 | 11/2017 | Salami et al. |
| 2018/0005186 | A1* | 1/2018 | Hunn ............... G06F 17/211 |
| 2018/0174255 | A1 | 6/2018 | Hunn et al. |
| 2018/0197155 | A1* | 7/2018 | Georgen ............ G06Q 20/023 |
| 2018/0300382 | A1 | 10/2018 | Madisetti et al. |
| 2018/0309567 | A1 | 10/2018 | Wooden |
| 2018/0373776 | A1 | 12/2018 | Madisetti et al. |
| 2019/0018887 | A1 | 1/2019 | Madisetti et al. |
| 2019/0018888 | A1 | 1/2019 | Madisetti et al. |
| 2019/0197532 | A1* | 6/2019 | Jayachandran .... G06Q 20/3829 |

FOREIGN PATENT DOCUMENTS

| | | |
|---|---|---|
| CN | 106559211 | 4/2017 |
| CN | 106960165 | 7/2017 |
| CN | 107425982 | 12/2017 |
| CN | 107464118 | 12/2017 |
| EP | 3257191 | 12/2017 |
| EP | 3257191 B1 * | 4/2018 ......... G06Q 20/3678 |
| TW | M543413 | 6/2017 |
| TW | 201732700 | 9/2017 |
| WO | WO 2008029853 | 3/2008 |
| WO | WO 2017090041 | 6/2017 |
| WO | WO 2018006072 | 1/2018 |
| WO | WO 2018200166 | 11/2018 |
| WO | WO 2018224431 | 12/2018 |
| WO | WO 2019090005 | 5/2019 |

OTHER PUBLICATIONS

Pandya, D., Ram, K., Thakkar, S., Madhekar, T., & Thakare, B. (2015). Brief History of Encryption. International Journal of Computer Applications, 131(9), 28-31. doi:10.5120/ijca2015907390 (Year: 2015).*

Fitzpatrick, S. M., & Mckeon, S. (2019). Banking on Stone Money: Ancient Antecedents to Bitcoin. Economic Anthropology, 7(1), 7-21. doi:10.1002/sea2.12154 (Year: 2019).*

Kurose, J. F., & Ross, K. W. (2017). Computer networking: A top-down approach. Boston: Pearson. (Year: 2017).*

International Search Report and Written Opinion in International Application No. PCT/US2019/031537, dated Jul. 23, 2019, 8 pages.

Crosby et al., "BlockChain Technology: Beyond Bitcoin," Sutardja Center for Entrepreneurship & Technology Technica Report, Oct. 16, 2015, 35 pages.

Nakamoto, "Bitcoin: A Peer-to-Peer Electronic Cash System," www.bitcoin.org, 2005, 9 pages.

U.S. Appl. No. 16/408,103, Lu et al., filed May 9, 2019.
U.S. Appl. No. 16/736,357, Wang et al., filed Jan. 7, 2020.
U.S. Appl. No. 16/750,993, Wang et al., filed Jan. 23, 2020.

Yaga et al., "NIST.IR.8202 Blockchain Technology Overview," Oct. 2018, National Institute of Standards and Technology, 68 pages.

* cited by examiner

BLOCKCHAIN DATA PROCESSING METHOD, APPARATUS, DEVICE, AND SYSTEM

CROSS-REFERENCE TO RELATED APPLICATIONS

This application claims priority to Chinese Patent Application No. 201810443381.9, filed on May 10, 2018, which is hereby incorporated by reference in its entirety.

TECHNICAL FIELD

The implementations of the present specification belong to the technical field of computer data processing, and in particular, related to a blockchain data processing method, apparatus, device, and system.

BACKGROUND

With the rapid development of the Internet, various types of data spring up and grow explosively. Blockchain has become a major focus and research direction in many technical fields because of its own features such as the decentralization feature, the tamper-resistance feature, and the distributed feature.

Currently, the blockchain data update is mainly driven based on transactions in blockchain. For example, transaction summary information within a time period is formed, and then is stored together with a summary of a previous blockchain to form a new block. In blockchain applications, for example, two parties can agree on smart contract content or a smart contract execution mode offline, and then store generated related data in a consortium blockchain. In the blockchain applications, a transaction participant is often involved in new establishment, change, termination, etc. of a smart contract state offline, and corresponding processing needs to be performed in the blockchain for the smart contract state transitions. Some implementations that currently exist include the following: Transaction parties confirm a smart contract transition state offline, then one of the parties can directly submit a smart contract state change instruction, and a corresponding node directly transitions the smart contract state after receiving the instruction. Obviously, in this centralized method, a smart contract state change message can be easily forged, and consequently there is the transaction risk. Therefore, in a blockchain data service, there is an urgent need for a solution that can implement smart contract state transition more effectively and securely.

SUMMARY

Implementations of the present specification are intended to provide a blockchain data processing method, apparatus, device, and system, to confirm a smart contract state based on multi-signatures of smart contract state participants, reduce transaction risks and transaction costs, and implement smart contract state transition securely and reliably.

The blockchain data processing method, apparatus, device, and system provided in the implementations of the present specification are implemented in the following ways:

A blockchain data processing method is provided, where the method includes the following: receiving a state transition message of a smart contract, where the state transition message includes signature data of a state participant of the smart contract; verifying the signature data by using a public key of the state participant; and confirming a smart contract state in the state transition message if signature data of K state participants is verified, where K≥1, and a value of K is pre-determined in the smart contract.

A blockchain data processing apparatus is provided, where the apparatus includes the following: a message receiving module, configured to receive a state transition message of a smart contract, where the state transition message includes signature data of a state participant of the smart contract; a signature verification module, configured to verify the signature data by using a public key of the state participant; and a state confirmation module, configured to confirm a smart contract state in the state transition message when signature data of K state participants is verified, where K≥1, and a value of K is pre-determined in the smart contract.

A blockchain data processing device is provided, where the processing device includes a processor and a memory configured to store an instruction that can be executed by the processor, and when executing the instruction, the processor implements the following operations: receiving a state transition message of a smart contract, where the state transition message includes signature data of a state participant of the smart contract; verifying the signature data by using a public key of the state participant; and confirming a smart contract state in the state transition message if signature data of K state participants is verified, where K≥1, and a value of K is pre-determined in the smart contract.

A blockchain system is provided, where the blockchain system includes a blockchain node device, the blockchain node device includes at least one processor and a memory configured to store an instruction that can be executed by the processor, and when executing the instruction, the processor implements the steps of the method according to any one of the implementations of the present specification.

A smart contract state can be confirmed based on multi-signatures of smart contract state participants by using the blockchain data processing method, apparatus, device, and system provided in the implementations of the present specification. If the multi-signatures are verified, it can be confirmed that a smart contract state transition message is valid, and data processing for smart contract state transition can be performed. In the solutions in the implementations of the present specification, there is no need to pay attention to smart contract content and to translate content of a smart contract, and the state can be confirmed by using the multi-signatures of the smart contract state participants. As such, transaction risks and transaction costs can be reduced, and the transaction processing efficiency can be improved. Therefore, a secure and reliable method for implementing smart contract state transition is provided.

BRIEF DESCRIPTION OF DRAWINGS

To describe technical solutions in the implementations of the present specification or in the existing technology more clearly, the following briefly describes the accompanying drawings needed for describing the implementations or the existing technology. Apparently, the accompanying drawings in the following descriptions merely show some implementations of the present specification, and a person of ordinary skill in the art can still derive other drawings from these accompanying drawings without creative efforts.

DESCRIPTION OF IMPLEMENTATIONS

Figure 1:
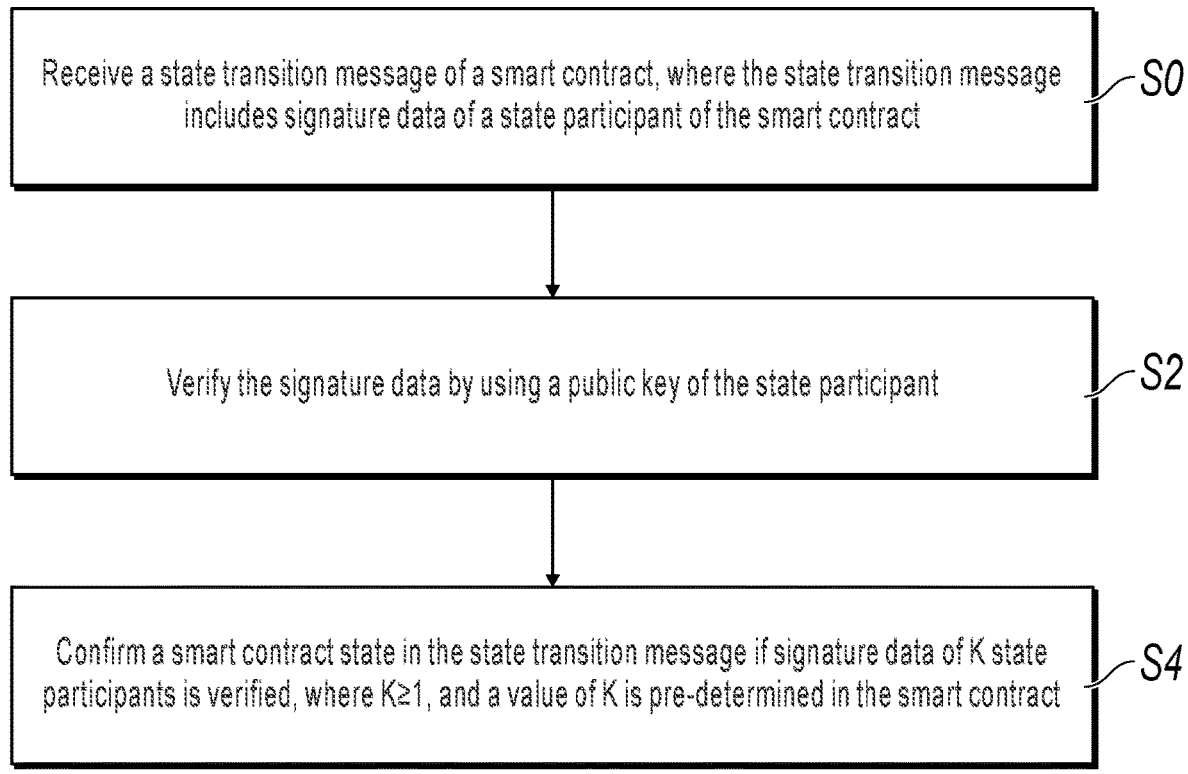
FIG. 1 is a schematic diagram illustrating a processing procedure of the method implementation of the present specification.

To make a person skilled in the art better understand the technical solutions in the present specification, the following clearly and comprehensively describes the technical solutions in the implementations of the present specification with reference to the accompanying drawings in the implementations of the present specification. Apparently, the described implementations are merely some rather than all of the implementations of the present specification. All other implementations obtained by a person of ordinary skill in the art based on the one or more implementations of the present specification without creative efforts shall fall within the protection scope of the implementations of the present specification.

The blockchain technology is abbreviated to BT (blockchain technology), is also referred to as a distributed ledger technology, and is an Internet database technology. Features of the blockchain technology include decentralization, openness and transparency, and data tamper-resistance. Currently, applications of the blockchain technology have been extended from a simple digital currency application to various fields of an economic society, for example, application scenarios such as financial services, supply chain management, cultural entertainment, real estates, health care, and e-commerce. A consortium blockchain can be established between a plurality of users or groups in a blockchain based on the features of the blockchain technology to satisfy service development demands of these users or groups, for example, a consortium blockchain with four blockchain nodes that is constructed by payment application A, medical service B, movie ticket application C, and taxi request application D. A consortium blockchain or a private blockchain can be established between a plurality of users, groups, or institutions in a blockchain based on the features of the blockchain technology, and the users, groups, or institutions join the blockchain and become members. Transaction data between the members can be stored in the blockchain, for example, content of a smart contract signed off-chain can be stored in the blockchain.

It is worthwhile to note that off-chain or on-chain in the implementations of the present specification mainly indicates whether a data operation is performed on a blockchain. Operations performed outside the blockchain can be off-chain related operations, for example, users negotiate and sign a smart contract offline, an authentication institution authenticates an identity, and a certificate is issued. Operations such as submitting a public key or a certificate to the blockchain, blockchain node verification, and data storage can be on-chain related operations. For example, submitting data to the blockchain for storage can be referred to as publishing to blockchain.

As the blockchain is gradually and widely applied to various industries, there are increasingly higher demands for the processing performance of the blockchain and the flexibility to satisfy enterprise business demands. In implementation solutions provided in the present specification, a blockchain node can implement transaction smart contract state transition in the blockchain based on multi-signatures, and there is no need to pay attention to smart contract content and to translate content of a smart contract, to implement self-management of the blockchain node.

A traditional smart contract is usually recorded on paper after smart contract participants reach a consensus through negotiation and discussion. A smart contract in the implementations of the present specification can be stored and recorded in a blockchain in a digital form or another computer data storage form (for example, a quantum computer). The contract in the implementations of the present specification can also become a smart contract. In blockchain technology applications, the smart contract can be a computer program including a digital smart contract that is driven by a transaction, has a state, and runs on a replicated and shared ledger, or can be an operation set that can be trusted and executed according to a prior rule. After the traditional smart contract is encoded into computer data by using a computer language, and the computer data is stored in the blockchain, the corresponding data can be the smart contract in some implementations of the present specification. Generally, after the smart contract is determined, the smart contract usually cannot be modified (not excluding modification allowed by blockchain code itself or smart contract modification made through smart contract invocation). However, the state of the smart contract can be transitioned, for example, from a pending state to a confirmed state, or from a confirmed state to a terminated state. There may be a plurality of smart contracts in the blockchain. Generally, each smart contract includes at least two smart contract participants, and smart contract content can include data operations related to establishment and execution of the smart contract. The smart contract can be encoded by using one or more computer languages and then be stored.

The following uses another application scenario as an example to describe the implementation solutions of the present specification. FIG. 1 is a schematic diagram of an implementation scenario of a blockchain data processing method, according to the present specification. Although the present specification provides method operation steps or apparatus structures shown in the following implementations or accompanying drawings, the method or apparatus can include more or fewer operation steps or modules/units after some are combined based on a conventional or non-creative effort. In steps or structures that have no necessary cause-effect relationship in logic, an execution sequence of these steps or a module structure of the apparatus is not limited to an execution sequence or a module structure shown in the implementations or the accompanying drawings of the present specification. When being applied to an actual apparatus, server, or terminal product, the method or module structure can be executed sequentially or concurrently according to the method or module structure shown in the implementations or accompanying drawings (for example, an environment of parallel processors or multi-thread processing, or even an implementation environment including distributed processing and a server cluster).

As shown in FIG. 1, in an implementation, the method can include the following steps:

S0. Receive a state transition message of a smart contract, where the state transition message includes signature data of a state participant of the smart contract.

S2. Verify the signature data by using a public key of the state participant.

S4. Confirm a smart contract state in the state transition message if signature data of K state participants is verified, where K≥1, and a value of K is pre-determined in the smart contract.

If the smart contract state needs to be transitioned, the initially established smart contract transitions from a pending (to be confirmed) state to a clear (confirmed) state. In this case, a blockchain node where one of the state participants (for example, the last one who confirms the smart contract) is located can initiate a state transition request for a smart contract. The state transition request can be a state transition message. Each node in the blockchain can receive the state transition message of the smart contract, and final confirmation of the smart contract state transition can be processed by a dedicated blockchain node or a blockchain node allocated according to a predetermined rule. After the state is confirmed, the state can be broadcast in the blockchain.

Generally, the signature and the verification key can be generated by each blockchain node. Smart contract participants are generally participants involved in the smart contract, for example, participants A, B, C, and D are involved in the smart contract content. The present implementation does not exclude a case that the contact participants can further include other participants allowed by an agreement, for example, a third party, a guarantor, a regulator, etc. that are not involved in transaction service content. Usually, the state participants can include all or some of the participants of the corresponding smart contract. For example, it can be pre-determined in the smart contract that, if the smart contract state is transitioned, all the participants need to sign and confirm the smart contract before the smart contract is validated and executed. Alternatively, it can be predetermined that smart contract participants A, B, and C are valid state participants, and that D cannot perform smart contract state transition. If the smart contract state is transitioned, all the state participants A, B, and C need to sign and confirm the smart contract before the smart contract is validated. Certainly, in another implementation, it can be agreed to add signature confirmation of another node, for example, a financial regulatory institution or a regulatory node set by a smart contract platform.

In some implementations of the present specification, the smart contract state transition can be set to needing private key signatures of all the state participants, and the state transition is performed after the signatures of all the state participants are verified. For ease of description, the signatures of all the state participants needed for the smart contract state transition can be referred to as multi-signatures. Therefore, in an implementation of the method, the confirming a smart contract state in the state transition message can include the following step:

S40. Perform smart contract state transition after determining that multi-signatures of the state participants are verified, where the multi-signatures include the signature data of the state participants needed for the smart contract state transition and pre-determined in the smart contract.

In some implementations of the present specification, if the smart contract state transition relates to content information of the smart contract, encryption can be performed by using a key, for example, encryption can be performed by using a private key. Generally, a key of the smart contract participant is generated by using a symmetric or asymmetric algorithm, and includes a public key and a private key. Public keys generated by public key participants can be sent to each other. Therefore, message content can be encrypted when the smart contract state is transitioned. As such, although blockchain nodes that correspond to other non-state participants of the smart contract can receive the state transition message of the smart contract, the blockchain nodes cannot verify the content and cannot perform corresponding operations. In an implementation of the method provided in the present specification, the state transition message is generated by the state participant through encryption processing, and a blockchain node where the state participant is located stores a decryption key that corresponds to the encryption processing.

Different from the symmetric encryption algorithm, two keys are generated by using the asymmetric encryption algorithm: a public key and a private key. The public key and the private key are a pair. If data is encrypted by using the public key, the data can be decrypted only by using the corresponding private key. If data is encrypted by using the private key, the data can be decrypted only by using the corresponding public key. In some implementation scenarios of the present specification, an algorithm used in asymmetric encryption can include RSA, Elgamal, a knapsack algorithm, Rabin, D-H, an elliptic curve cryptography (ECC), etc.

In another implementation of the present specification, a key generated by using an asymmetric encryption algorithm can be temporary key information, and can be dynamically updated according to a specified rule, for example, the key is updated once a day or the key is updated once a week. An updated public key can be sent to a corresponding state participant through an end-to-end encrypted new information channel; or can be stored in the blockchain, and be obtained after a blockchain node is authorized to perform query. A blockchain node of the smart contract participant can verify the state transition message by using the public key, and confirm that the message is sent by a real smart contract participant. Therefore, in another implementation of the method in the present specification, the signature data and the key used during verification processing include a temporary key that is dynamically updated according to a predetermined rule.

Figure 2:
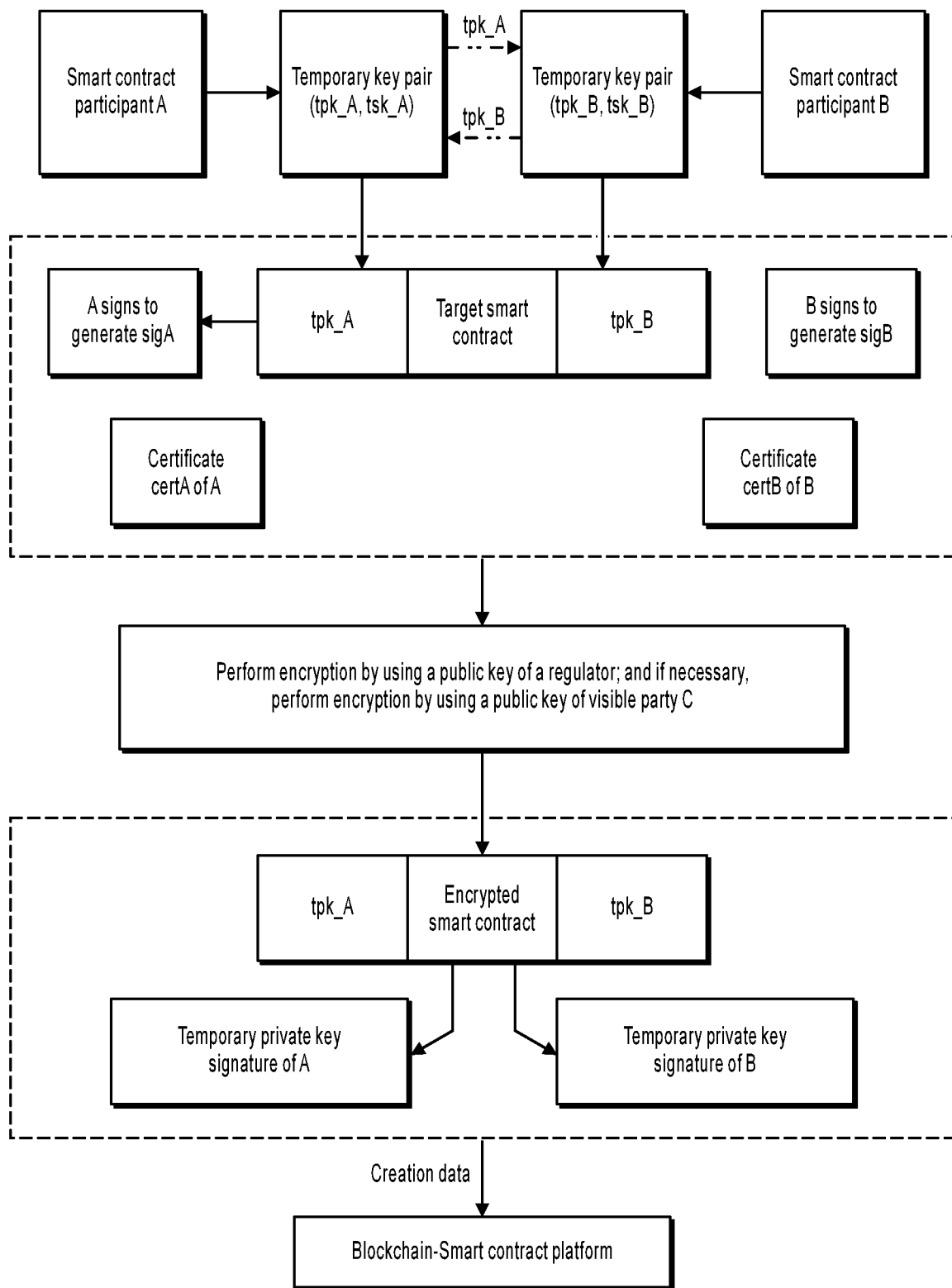
FIG. 2 is a schematic diagram illustrating an implementation scenario of creating an unconfirmed-state smart contract, according to an implementation of the present specification.

The smart contract state transition in the previous implementation can occur at a processing stage of smart contract establishment, or can occur at a processing stage of smart contract execution. The establishment or execution of the smart contract can include the creation of the previously described template smart contract, can include signing and conformation of a formal smart contract, or can include processing of the smart contract execution. The smart contract can be considered as a type of agreement. FIG. 2 is a schematic diagram illustrating an implementation scenario of creating an unconfirmed-state smart contract, according to an implementation of the present specification. Certainly, the description of the following implementation does not constitute a limitation on other extensible technical solutions based on the present specification. For example, in other implementation scenarios, state transition processing involved in smart contract transactions can be performed by using one or more implementation solutions in the present specification. In a broader sense, the transaction can further include data operations, such as memos, agreements, regulations, reporting, and public notifications, that need to be stored by a single party, two parties, or a plurality of parties in the blockchain to update data of the blockchain node. An application scenario is shown in FIG. 2. Assume that smart contract participants A and B are involved in a target smart contract. A and B are members of a consortium blockchain and respectively hold corresponding certificates. The certificate can prove that the smart contract participant is an authorized member in the blockchain, and can perform processing such as smart contract creation or execution in the blockchain.

After the smart contract is created, the state of the smart contract stored in the blockchain is a pending state. Specific processes can include the following:

A and B can independently generate their own temporary key pairs (tpk_A, tsk_A) and (tpk_B, tsk_B). The temporary public keys of both parties can be used to perform data transmission through an established end-to-end encrypted channel, for example, an end-to-end encrypted channel based on the Secure Sockets Layer (SSL) protocol. As such, the security of data transmission can be further improved. To support end-to-end offline communication demands of two users in the blockchain, the users (including a smart contract participant) usually need to check identities mutually, and can communicate with the blockchain to query each other's identity through the blockchain and to check whether the user is an authorized user in the blockchain. A procedure can include the following steps:

(1) Users A and B can register entity information and digital identities with a blockchain platform in a form of a smart contract or a non-smart contract by using a blockchain registration institution. The blockchain platform checks a signature of the registration institution. After the check succeeds, the entity information and the digital identities of A and B are stored in the blockchain. The digital identity can include a public key, a private key, etc. of the user, and the entity information can include information such as a user's name and an identity card.

(2) User A and user B establish an encrypted channel. First, A and B mutually send each other's digital identity summary to the blockchain platform. After the platform finds that A and B are authorized users, the platform returns acknowledgement messages to A and B; or otherwise, returns negative acknowledgement messages, and communication between A and B is terminated in this case.

(3) To confirm the identity of B, A can obtain query authorization (namely, a signature on a query request of A) from B to submit a query application to the blockchain. Similarly, B performs the same step to submit a query about A.

(4) The blockchain platform checks the query and authorization signatures of A and B, and finds that A and B are blockchain users, and sends the entity information of A and B to both parties respectively. If A or B is not a blockchain user, the platform returns a failure message. Communication between A and B is terminated in this case.

(5) After checking each other's entity information, A and B use the digital identities to establish the encrypted channel to exchange messages, for example, exchange temporary public keys.

After sending the temporary public keys to each other, A and B can separately use their own private key pairs (smart contract content of a target smart contract, tpk_A, and tpk_B) to sign to generate data that is signed by using their respective private keys. The data here can be collectively referred to as first signature data. Similarly, a signature on the smart contract content of the target smart contract can also be briefly referred to as a signature on the target smart contract. For example, A can use a private key tsk_A pair (target smart contract, tpk_A, tpk_B) to sign to generate first signature data sigA of A, and B can use a private key tsk_B pair (target smart contract, tpk_A, tpk_B) to sign to generate first signature data sigB of B. The first signature data can also be mutually sent, for example, A sends sigA to B.

In application scenarios of some implementations, a transaction of a smart contract can be regulated by a regulator, and the regulator can review, examine and verify, check, or prevent the smart contract, and regulate illegal acts based on the smart contract. In some implementations, the regulator can be a legitimate regulatory institution, for example, national financial regulatory institutions such as the Central Bank and the China Securities Regulatory Commission, and can regulate blockchain transactions by using a regulatory key. In some other implementations, a regulator that has a regulatory right, such as one or more specified members, can be pre-determined in a smart contract rule. Alternatively, in another implementation, it can be agreed that a member has a regulatory right when a predetermined number or proportion of members acknowledge the member. The member who has been acknowledged by the predetermined number or proportion of members here can become a member of a regulatory member group. For example, if there are 10 members in the blockchain, it can be predetermined that member A can serve as a regulator if seven members or 70% of the members acknowledge member A.

Information content encrypted by using a regulatory public key broadcast by the regulator can include the target smart contract (smart contract content), temporary public keys of the smart contract participants, and the signature data of the smart contract participants, or can include certificates of the smart contract participants. For example, A uses a regulatory key pair (target smart contract, tpk_A, tpk_B, sigA, sigB, certA, certB) to encrypt the smart contract to generate the encrypted smart contract. The encrypted smart contract can be generated by any one of the smart contract participants after processing. As such, the regulator can use a decryption key that corresponds to the regulator, such as a private key, to obtain the target smart contract from the blockchain, and verify whether the smart contract participant is authorized and whether the smart contract content is illegal, etc., to supervise and manage the smart contract in the blockchain. For example, if the regulator finds that there is an illegal transfer of a technology related to a national defense patent in the smart contract after reviewing the smart contract content and foreign partners by using the decrypted smart contract, the regulator can prevent proceeding of the smart contract by submitting a blockchain transaction. Certainly, in other implementations, if a transaction involved in the target smart contract is visible to another blockchain member C, a public key of C can also be used for encryption. For a processing way of using the public key of C to perform encryption and a processing way that member C uses a private key of C to perform decryption to view the target smart contract, references can be made to the processing of the regulator, and details are omitted here for simplicity.

Before the generated encrypted smart contract is published to the blockchain, the smart contract participants can sign the encrypted smart contract by using the private key, and signed data together with the temporary public keys tpk_A and tpk_B of the smart contract participants are used as creation data stored in the blockchain.

The creation data can be submitted to the blockchain for storage. Certainly, a smart contract platform can be further disposed in the blockchain, and the creation data can be submitted to the smart contract platform and managed by the smart contract platform.

Figure 3:
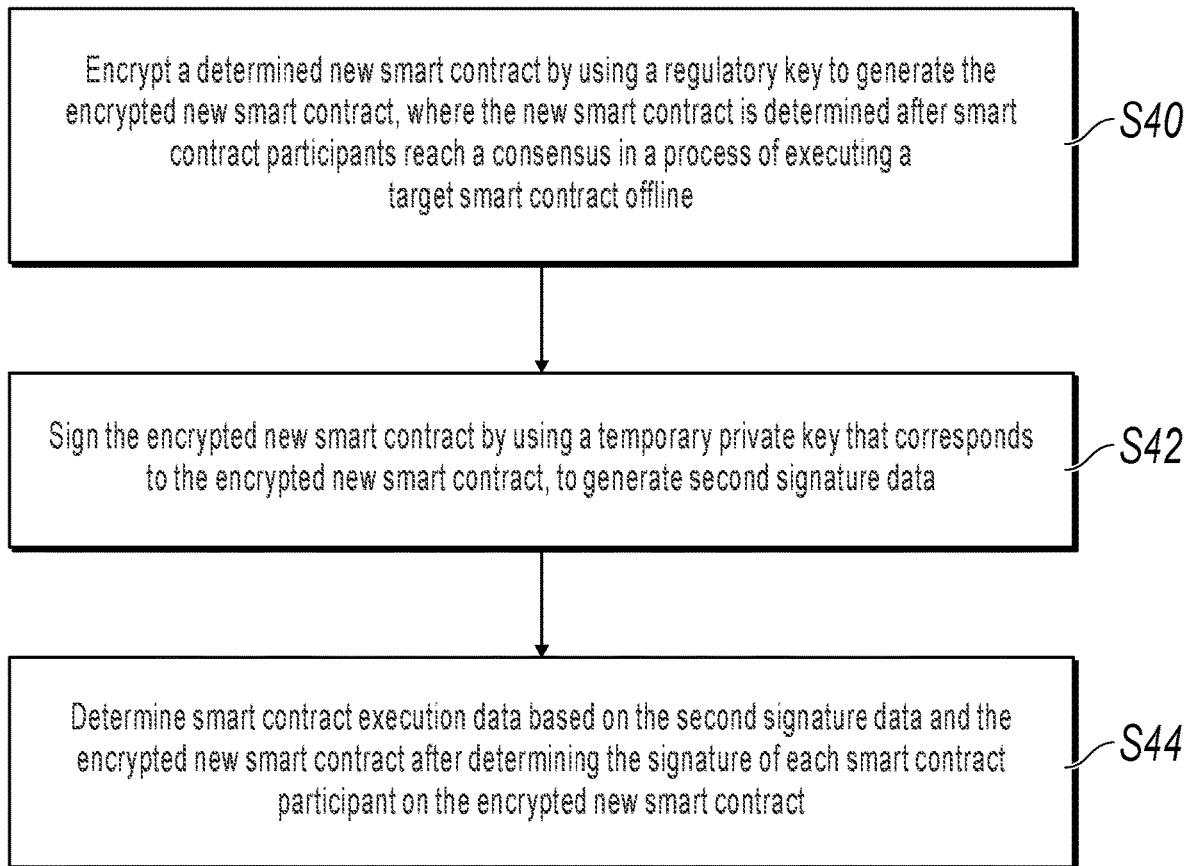
FIG. 3 is a schematic flowchart illustrating a smart contract execution implementation in a blockchain data processing method, according to the present specification.

FIG. 3 is a schematic flowchart illustrating a smart contract execution implementation in a blockchain data processing method, according to the present specification. As shown in FIG. 3, blockchain data can further include smart contract execution data, and the smart contract execution data is determined by using the following method:

S40. Encrypt a determined new smart contract by using a regulatory key to generate the encrypted new smart contract, where the new smart contract is determined after smart contract participants reach a consensus in a process of executing a target smart contract offline.

S42. Each smart contract participant can sign the encrypted new smart contract by using a temporary private key that corresponds to the encrypted new smart contract, to generate second signature data.

S44. Determine smart contract execution data based on the second signature data and the encrypted new smart contract.

For a processing apparatus of the smart contract participant, the execution processing in step S42 can be understood as determining the smart contract execution data based on the second signature data and the encrypted new smart contract after determining the signature of each smart contract participant on the encrypted new smart contract. For example, after a smart contract participant determines that all other smart contract participants (including the smart contract participant) sign by using the temporary private keys, the second signature data signed by the participants and the encrypted new smart contract are determined as the smart contract execution data. Then the smart contract execution data can be submitted to the blockchain. The temporary key that corresponds to the encrypted new smart contract shown in S42 can be the same as or different from a temporary key used when the target smart contract that corresponds to the encrypted new smart contract is created. For example, a temporary-key replacement period has been reached when smart contract content is updated to sign the determined new smart contract. In this case, a temporary key used when the encrypted new smart contract is signed is different from the temporary key used when the previous corresponding target smart contract is created and stored in the blockchain. The updated temporary key can be updated to corresponding data in the blockchain by submitting a transaction.

Figure 4:
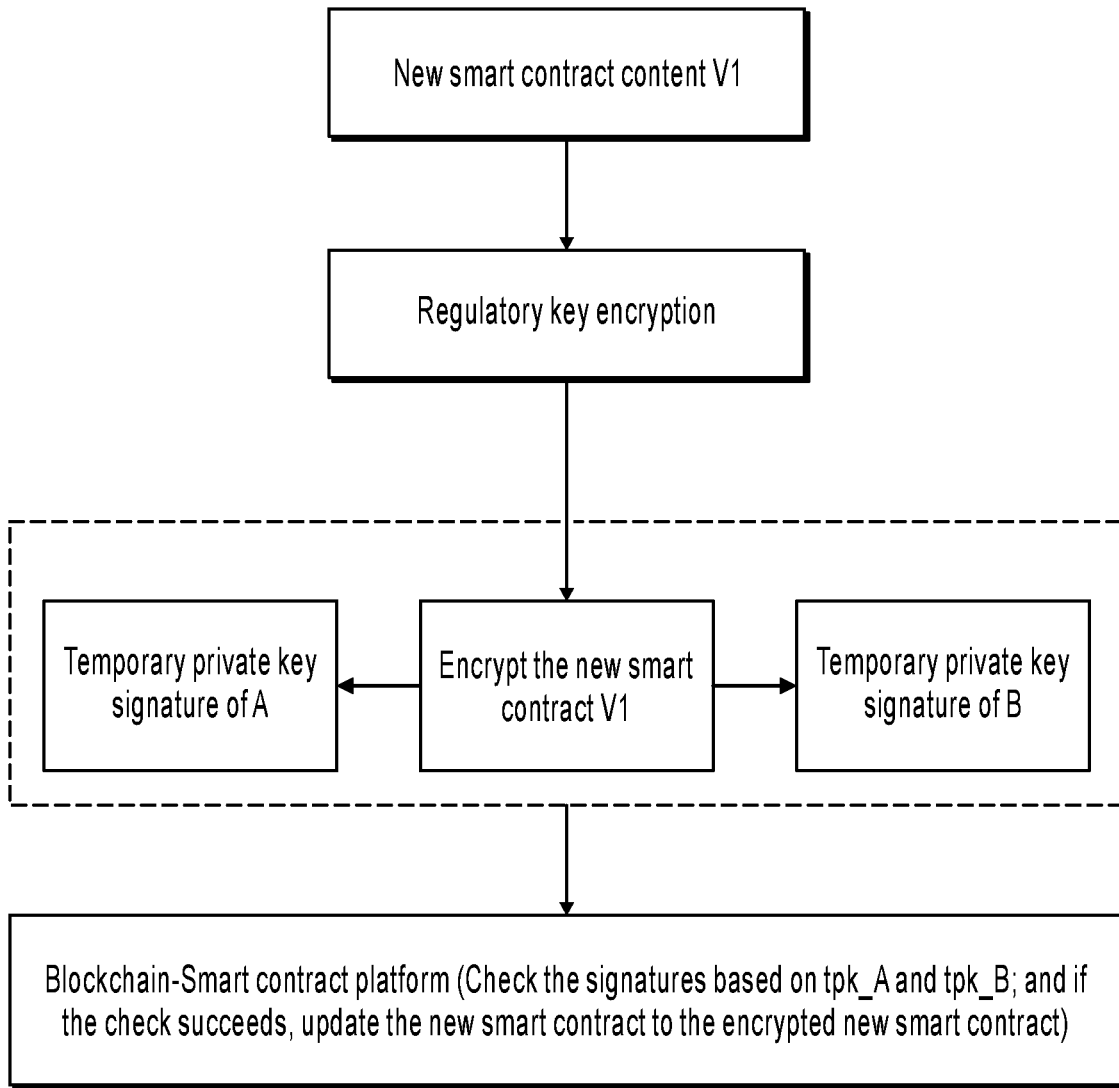
FIG. 4 is a schematic diagram illustrating an implementation example of processing data by using a temporary key in a smart contract execution process, according to the present specification.

FIG. 4 is a schematic diagram illustrating an implementation example of processing data by using a temporary key in a smart contract execution process, according to the present specification. As shown in FIG. 4, assume that the smart contract execution involves the interests of both parties A and B. A and B reach a consensus on the smart contract execution process offline, for example, adding or modifying smart contract content to form a new smart contract V1. A or B encrypts the new smart contract by using a regulatory key to generate the encrypted new smart contract V1. Then each smart contract participant can sign by using a temporary private key of a corresponding original target smart contract. For example, A can sign by using a temporary private key tsk_A used when the target smart contract is established, and then B can sign by using a temporary private key tsk_B. Data signed by all the smart contract participants and the encrypted new smart contract are published to the blockchain together. Data that includes the second signature data and the data of encrypted new smart contract that is to be submitted to the blockchain can be referred to as the smart contract execution data, or data that is submitted to the blockchain and then is stored can be referred to as the smart contract execution data. A processing way of creation data of the target smart contract is the same as the processing way of the data. In this process, different from creating a new smart contract, A and B may not need to obtain the authorization from the regulator in a process of executing smart contract state transition, for example, the smart contract change, the smart contract validity, the smart contract interruption, and the smart contract termination. The smart contract content and the smart contract state can be validated after the smart contract participant performs encryption by using the regulatory public key and then each smart contract participant signs by using the private key to determine the new smart contract or after the smart contract state is transitioned. In the present implementation, the regulator can review and check data information of a transaction. Except for special regulations, the authorization does not need to be obtained from the regulator for the initiation or execution of a transaction, such as the smart contract update.

The generated blockchain data can be submitted to the blockchain for storage. Certainly, a smart contract platform can be further disposed in the blockchain, and the blockchain data can be submitted to the smart contract platform and managed by the smart contract platform.

In an application scenario of the present implementation, the smart contract execution can include supplementing and confirming the content of the smart contract in an initially created format. After both parties A and B reach a consensus to confirm the smart contract, the state of the smart contract in the blockchain needs to be transitioned from a pending state to a confirmed state. In this case, blockchain nodes where A and B are located can send state transition messages to the smart contract management platform, and A and B use their own private keys to sign in their respective state transition messages. The smart contract management platform performs signature verification when receiving the state transition message sent by either of A and B. In this case, even if the verification succeeds, state transition is not performed. The smart contract state transition is confirmed only after multi-signatures of A and B are received and the multi-signatures are verified.

A smart contract state can be confirmed based on multi-signatures of smart contract state participants by using the blockchain data processing method provided in the implementations of the present specification. If the multi-signatures are verified, it can be confirmed that a smart contract state transition message is valid, and data processing for smart contract state transition can be performed. In the implementations of the present specification, there is no need to pay attention to smart contract content and to translate content of a smart contract, and the state can be confirmed by using the multi-signatures of the smart contract state participants. As such, transaction risks and transaction costs can be reduced, and the transaction processing efficiency can be improved. Therefore, a secure and reliable method for implementing smart contract state transition is provided.

The implementations of the method in the present specification are described in a progressive way. For the same or similar parts in the implementations, references can be made to the implementations. Each implementation focuses on a difference from other implementations. For related parts, references can be made to related descriptions in the method implementation.

Figure 5:
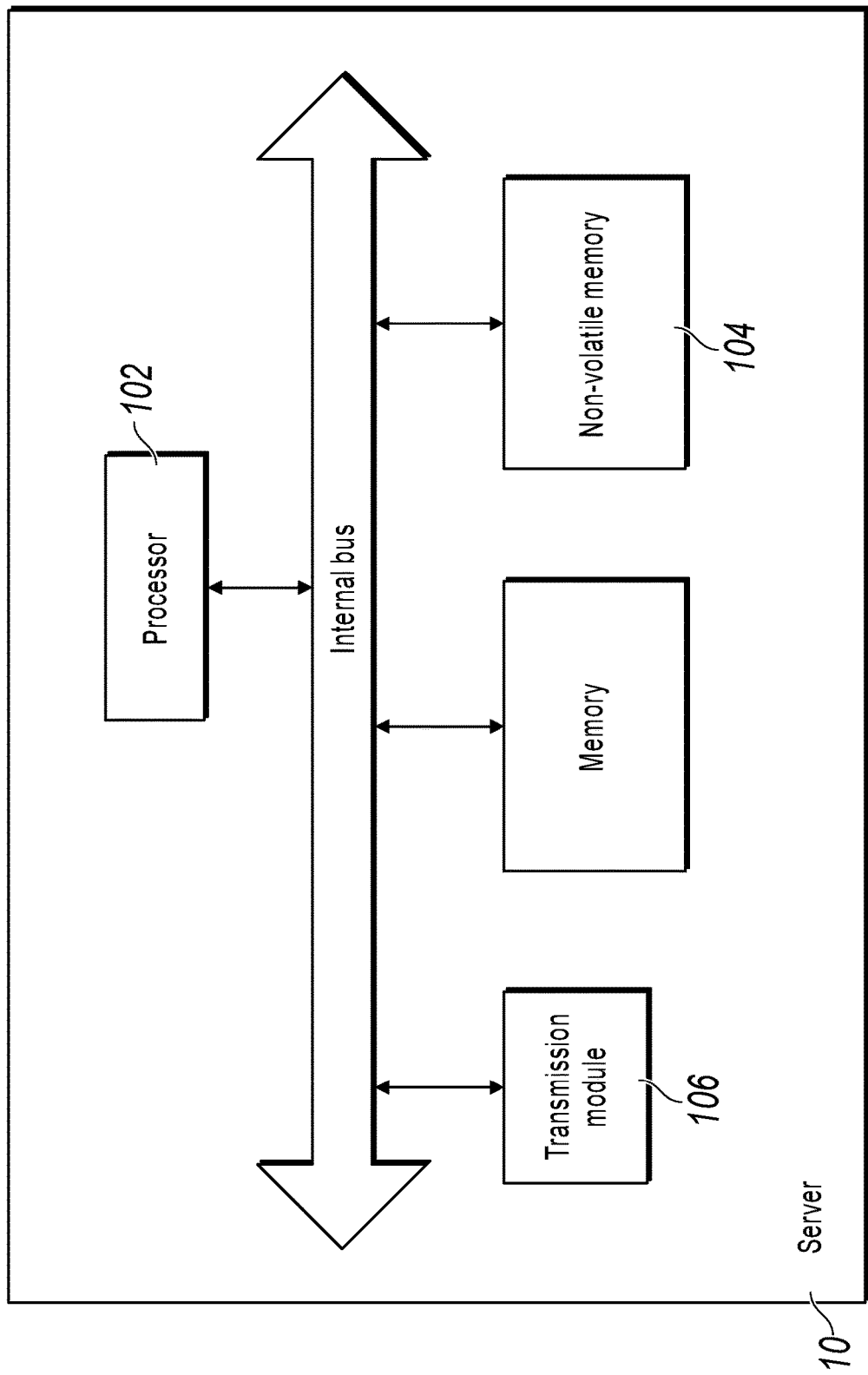
FIG. 5 is a block diagram illustrating a hardware structure of a blockchain data processing device, according to an implementation of the present invention.

The method implementation provided in the implementations of the present application can be performed in a blockchain terminal device, a blockchain server, or a similar operation apparatus. For example, the method is run on a blockchain node device (which can be a client, a single server, or a server cluster). FIG. 5 is a block diagram illustrating a hardware structure of a blockchain data processing device, according to an implementation of the present invention. As shown in FIG. 5, the blockchain processing device 10 can include one or more (only one is shown in the figure) processors 102 (the processor 102 can include but is not limited to a processing apparatus such as a microprocessor (such as an MCU) or a programmable logic device (such as an FPGA)), a memory 104 configured to store data, and a transmission module 106 configured to perform a communication function. A person of ordinary skill in the art can understand that the structure shown in FIG. 5 is merely an example, and does not impose a limitation on a structure of the electronic apparatus. For example, the processing device 10 can further include more or fewer components than those shown in FIG. 5. For example, the processing device 10 can further include other processing hardware such as a graphics processing unit (GPU), or have a configuration different from that shown in FIG. 5.

The memory 104 can be configured to store a software program and a module of application software, for example, a program instruction/module that corresponds to the blockchain data processing method in the implementations of the present invention. The processor 102 performs various function applications and data processing by running the software program and the module stored in the memory 104, to implement the processing method. The memory 104 can include a high-speed random access memory, and can further include a non-volatile memory, for example, one or more magnetic storage apparatuses, a flash memory, or another non-volatile solid-state memory. In some instances, the memory 104 can further include a memory remotely disposed relative to the processor 102. The remote memories can be connected to the computer terminal device 10 by using a network. Instances of the network include but are not limited to the Internet, an enterprise intranet, a local area network, a mobile communications network, and a combination thereof.

The transmission module 106 is configured to receive or send data by using a network. An instance of the network can include a wireless network provided by a communication provider of the computer terminal device 10. In an instance, the transmission module 106 includes a network interface controller (NIC), which can communicate with the Internet by connecting to another network device by using a base station. In an instance, the transmission module 106 can be a radio frequency (RF) module, which is configured to communicate with the Internet in a wireless way.

Figure 6:
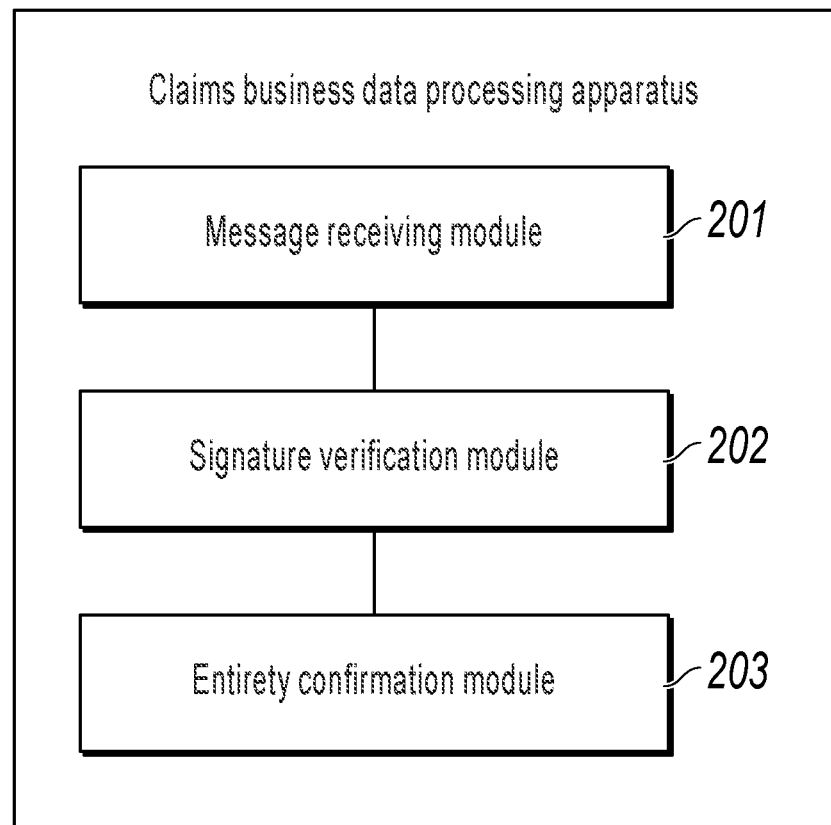
FIG. 6 is a schematic structural diagram illustrating modules implemented in a blockchain data processing apparatus, according to an implementation of the present invention.

Based on the blockchain data processing method, the present specification further provides a blockchain data processing apparatus. The apparatus can include a device apparatus with reference to necessary implementation hardware and using a system (including a distributed system), software (an application), a module, a component, a server, a client, etc. of the method in the implementations of the present specification. Based on the same innovative idea, a processing apparatus provided in an implementation of the present specification is described as follows. Because a problem-resolving implementation solution of the apparatus is similar to that of the method, for implementation of the processing apparatus in the implementations of the present specification, references can be made to the implementation of the previous method. No repeated description is provided. Although the apparatus described in the following implementations is preferably implemented by software, implementation of hardware or a combination of software and hardware is possible to conceive. As shown in FIG. 6, in an implementation of a blockchain data processing apparatus that can be applied to a blockchain node, the blockchain data processing apparatus can include the following: a message receiving module 201, configured to receive a state transition message of a smart contract, where the state transition message includes signature data of a state participant of the smart contract; a signature verification module 202, configured to verify the signature data by using a public key of the state participant; and a state confirmation module 203, configured to confirm a smart contract state in the state transition message when signature data of K state participants is verified, where K≥1, and a value of K is pre-determined in the smart contract.

It is worthwhile to note that the processing apparatus described in the present implementation of the present specification can further include another implementation according to the description of the related method implementation. For an implementation, references can be made to the description of the method implementation, and details are omitted here for simplicity.

The blockchain data processing method provided in the implementations of the present specification can be implemented by a processor executing a corresponding program instruction in a computer, for example, can be implemented at a PC end/server by using the C++/Java language in a Windows/Linux operating system, or implemented by using hardware necessary to a corresponding application design language set in another system such as Android and iOS, or implemented based on processing logic of a quantum computer. In an implementation of implementing the method by a processing device provided in the present specification, the processing device can include a processor and a memory configured to store an instruction that can be executed by the processor, and when executing the instruction, the processor performs the following operations: receiving a state transition message of a smart contract, where the state transition message includes signature data of a state participant of the smart contract; verifying the signature data by using a public key of the state participant; and confirming a smart contract state in the state transition message if signature data of K state participants is verified, where K≥1, and a value of K is pre-determined in the smart contract.

Based on the description of the previous method implementation, in another implementation of the device, the confirming a smart contract state in the state transition message includes the following: performing smart contract state transition after determining that multi-signatures of the state participants are verified, where the multi-signatures include the signature data of the state participants needed for the smart contract state transition and pre-determined in the smart contract.

Based on the description of the previous method implementation, in another implementation of the device, the state transition message is generated by the state participant through encryption processing, and a blockchain node where the state participant is located stores a decryption key that corresponds to the encryption processing.

Based on the description of the previous method implementation, in another implementation of the device, the signature data and a key used during verification processing include a temporary key that is dynamically updated according to a predetermined rule.

The previous apparatus or setting can be applied to a server of the blockchain node.

The instruction can be stored in a plurality of computer readable storage media. The computer readable storage medium can include a physical apparatus configured to store information. The information can be digitized and then stored by using media that uses an electric way, a magnetism way, an optic way, etc. The computer readable storage medium in the present implementation can include an apparatus that stores information in the electric way, for example, various memories such as a RAM or a ROM; an apparatus that stores information in the magnetism way, for example, a hard disk, a floppy disk, a magnetic tape, a magnetic core memory, a bubble memory, or a USB flash drive; and an apparatus that stores information in the optic way, such as a CD or a DVD. Certainly, there is a readable storage medium of another form such as a quantum memory or a graphene memory. Instructions in the apparatus, the server, the client, the processing device, or the system in the present implementation are the same as the instruction described above.

Based on the previous description, an implementation of the present specification further provides a blockchain system including a blockchain node device, the blockchain node device includes at least one processor and a memory configured to store an instruction that can be executed by the processor, and when executing the instruction, the processor implements the steps described in any one of the method implementations in the implementations of the present specification.

It is worthwhile to note that the apparatus, the processing device, and the system described in the implementations of the present specification can further include another implementation according to the description of the related method implementation. For an implementation, references can be made to the description of the method implementation, and details are omitted here for simplicity.

The implementations of the present specification are described in a progressive way. For the same or similar parts in the implementations, references can be made to the implementations. Each implementation focuses on a difference from other implementations. Especially, a hardware and program implementation is basically similar to a method implementation, and therefore is described briefly. For related parts, references can be made to related descriptions in the method implementation.

Particular implementations of the present application are described above. Other implementations fall within the scope of the appended claims. In some cases, the actions or steps described in the claims can be performed in an order different from the order in the implementations and the desired results can still be achieved. In addition, the process described in the accompanying drawings does not necessarily require a particular execution order to achieve the desired results. In some implementations, multi-tasking and parallel processing can be advantageous.

A smart contract state can be confirmed based on multi-signatures of smart contract state participants by using the blockchain data processing method, apparatus, device, and system provided in the implementations of the present specification. If the multi-signatures are verified, it can be confirmed that a smart contract state transition message is valid, and data processing for smart contract state transition can be performed. In the solutions in the implementations of the present specification, there is no need to pay attention to smart contract content and to translate content of a smart contract, and the state can be confirmed by using the multi-signatures of the smart contract state participants. As such, transaction risks and transaction costs can be reduced, and the transaction processing efficiency can be improved. Therefore, a secure and reliable method for implementing smart contract state transition is provided.

Although the present application provides the operation steps of the method according to the implementations or the flowcharts, more or fewer operation steps can be included based on conventional or noncreative efforts. The sequence of the steps listed in the implementations is merely one of numerous step execution sequences, and does not represent the unique execution sequence. For an actual apparatus or client product, the steps can be executed based on the method sequence shown in the implementations or the accompanying drawings or executed in parallel (for example, an environment of parallel processors or multi-thread processing).

Although the content of the implementations of the present specification mentions data description and operations such as data acquisition, definition, interaction, calculation, determining, and encryption, for example, SSL encrypted communication, a regulatory key generation method, transaction definition description including smart contract establishment and execution, and an encryption signature performed by using a public key and a private key, the implementations of the present specification are not necessarily limited to the described cases that conform to an industry communications standard, a standard asymmetric encryption algorithm, a communications protocol, a standard data model/template, or an implementation of the present specification. A slightly modified implementation obtained by using some industry standards, or in a self-defined way, or on a basis of described implementations can also implement an implementation effect that is the same as, equivalent to, or similar to the described implementation, or an expected implementation effect obtained after transformation. An obtained implementation that is obtained by applying a modified or transformed data acquisition, storage, determining, and processing way can still fall within the scope of an optional implementation solution of the present specification.

In the 1990s, whether a technical improvement is a hardware improvement (for example, an improvement to a circuit structure, such as a diode, a transistor, or a switch) or a software improvement (an improvement to a method procedure) can be clearly distinguished. However, with the development of technologies, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, such programming is mostly implemented by using "logic compiler" software. The logic compiler software is similar to a software compiler used to develop and write a program. Raw code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person of ordinary skill in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller, etc. Therefore, the controller can be considered as a hardware component, and an apparatus included in the controller and configured to implement various functions can also be considered as a structure in the hardware component. Or, the apparatus configured to implement various functions can even be considered as both a software module implementing the method and a structure in the hardware component.

The system, apparatus, module, or unit illustrated in the previous implementations can be implemented by using a computer chip or an entity, or can be implemented by using a product having a certain function. A typical implementation device is a computer. Specifically, the computer can be, for example, a personal computer, a laptop computer, an in-vehicle man-machine interaction device, a cellular phone, a camera phone, a smartphone, a personal digital assistant, a media player, a navigation device, an email device, a game console, a tablet computer, or a wearable device, or a combination of any of these devices.

Although the implementations of the present specification provide the operation steps of the method according to the implementations or the flowcharts, more or fewer operation steps can be included based on conventional or noncreative means. The sequence of the steps listed in the implementations is merely one of numerous step execution sequences, and does not represent the unique execution sequence. For an actual apparatus or terminal product, the steps can be executed based on the method sequence shown in the implementations or the accompanying drawings or executed in parallel (for example, an environment of parallel processors or multi-thread processing, or even a distributed data processing environment). Terms "include", "contain", or their any other variant is intended to cover non-exclusive inclusion, so that a process, a method, a product, or a device that includes a series of elements not only includes these very elements, but also includes other elements which are not expressly listed, or further includes elements inherent to such process, method, product, or device. Without more constraints, an element does not preclude the existence of additional identical elements in the process, method, product, or device that includes the element.

For ease of description, the previous apparatus is described by dividing the functions into various modules. Certainly, when the implementations of the present specification are implemented, function of various modules can be implemented in one or more pieces of software and/or hardware, modules that implement the same function can be implemented by using a combination of a plurality of sub-modules or subunits, etc. The described apparatus implementations are merely examples. For example, the unit division is merely logical function division and can be other division in actual implementation. For example, a plurality of units or components can be combined or integrated into another system, or some features can be ignored or not performed. In addition, the displayed or discussed mutual couplings or direct couplings or communication connections can be implemented by using some interfaces. The indirect couplings or communication connections between the apparatuses or units can be implemented in electronic, mechanical, or other forms.

A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus included in the controller and configured to implement various functions can also be considered as a structure in the hardware component. Or, the apparatus configured to implement various functions can even be considered as both a software module implementing the method and a structure in the hardware component.

The present invention is described with reference to the flowcharts and/or block diagrams of the method, the device (system), and the computer program product according to the implementations of the present invention. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a special-purpose computer, a built-in processor, or a processor of another programmable data processing device to generate a machine, so that the instructions executed by the computer or the processor of the another programmable data processing device generate an apparatus for implementing a specified function in one or more flows in the flowcharts and/or in one or more blocks in the block diagrams.

These computer program instructions can be stored in a computer readable memory that can instruct the computer or the another programmable data processing device to work in a specific way, so that the instructions stored in the computer readable memory generate an artifact that includes an instruction apparatus. The instruction apparatus implements a specified function in one or more flows in the flowcharts and/or in one or more blocks in the block diagrams.

These computer program instructions can be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specified function in one or more flows in the flowcharts and/or in one or more blocks in the block diagrams.

In a typical configuration, a computing device includes one or more processors (CPU), an input/output interface, a network interface, and a memory.

The memory can include a non-persistent memory, a random access memory (RAM), a non-volatile memory, and/or another form in a computer readable medium, for example, a read-only memory (ROM) or a flash memory (flash RAM). The memory is an example of the computer readable medium.

The computer readable medium includes persistent, non-persistent, movable, and unmovable media that can implement information storage by using any method or technology. Information can be a computer readable instruction, a data structure, a program module, or other data. An example of a computer storage medium includes but is not limited to a phase change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a tape and disk storage or another magnetic storage device or any other non-transmission media that can be configured to store information that can be accessed by a computing device. Based on the definition in the present specification, the computer readable medium does not include transitory computer readable media (transitory media), for example, a modulated data signal and carrier.

A person skilled in the art should understand that an implementation of the present specification can be provided as a method, a system, or a computer program product. Therefore, the implementations of the present specification can use a form of hardware only implementations, software only implementations, or implementations with a combination of software and hardware. Moreover, the implementations of the present specification can use a form of a computer program product that is implemented on one or more computer-usable storage media (including but not limited to a disk memory, a CD-ROM, an optical memory, etc.) that include computer-readable program code.

The implementations of the present specification can be described in the general context of computer-executable instructions, for example, a program module. Generally, the program module includes a routine, a program, an object, a component, a data structure, etc. executing a particular task or implementing a particular abstract data type. The implementations of the present specification can alternatively be practiced in distributed computing environments in which tasks are executed by remote processing devices that are connected through a communications network. In the distributed computing environment, the program module can be located in both local and remote computer storage media including storage devices.

The implementations of the present specification are described in a progressive way. For the same or similar parts in the implementations, references can be made to the implementations. Each implementation focuses on a difference from other implementations. Especially, a system implementation is basically similar to a method implementation, and therefore is described briefly. For related parts, references can be made to related descriptions in the method implementation. In the descriptions of the present specification, reference terms such as "an implementation", "some implementations", "example", "specific example", and "some examples" mean that specific features, structures, materials, or characteristics described with reference to the implementations or examples are included in at least one implementation or example in the implementations of the present specification. In the present specification, the previous example expressions of the terms are not necessarily with respect to the same implementation or example. In addition, the described specific features, structures, materials, or characteristics can be combined in a proper way in any one or more of the implementations or examples. In addition, a person skilled in the art can integrate or combine different implementations or examples and characteristics of different implementations or examples described in the present specification, provided that they do not conflict with each other.

The previous descriptions are merely implementations of the present specification, and are not intended to limit the implementations of the present specification. For a person skilled in the art, the implementations of the present specification can have various changes and variations. Any modifications, equivalent substitutions, and improvements made within the spirit and the principle of the implementations of the present specification shall fall within the scope of the claims in the implementations of the present specification.

Figure 7:
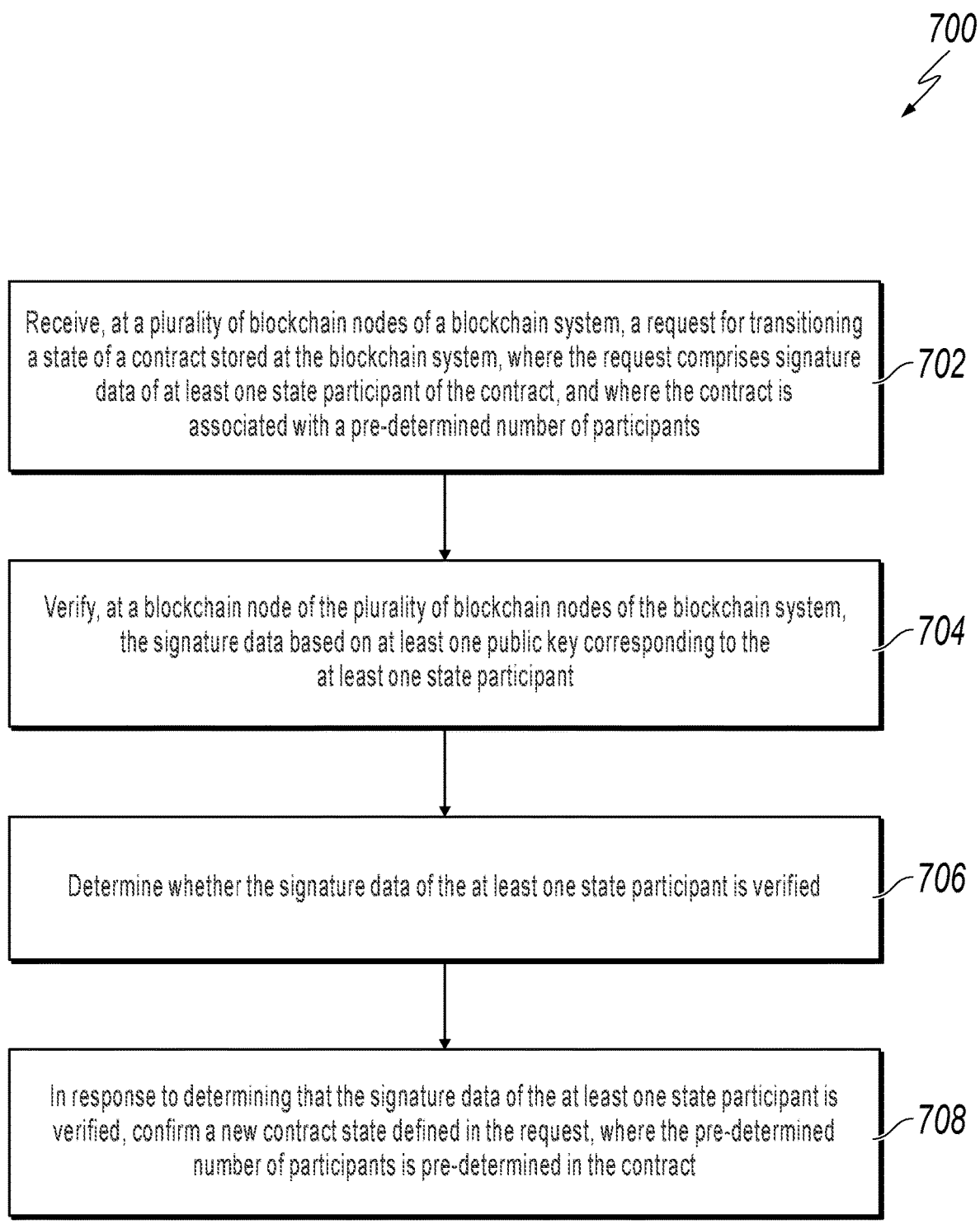
FIG. 7 is a flowchart illustrating an example of a computer-implemented method for confirming a new contract state of a contract stored at a blockchain system, according to an implementation of the present disclosure.

FIG. 7 is a flowchart illustrating an example of a computer-implemented method 700 for confirming a new contract state of a contract stored at a blockchain system, according to an implementation of the present disclosure. For clarity of presentation, the description that follows generally describes method 700 in the context of the other figures in this description. However, it will be understood that method 700 can be performed, for example, by any system, environment, software, and hardware, or a combination of systems, environments, software, and hardware, as appropriate. In some implementations, various steps of method 700 can be run in parallel, in combination, in loops, or in any order.

At 702, a request for transitioning a state of a contract stored at a blockchain system is received at a plurality of blockchain nodes of the blockchain system. The request includes signature data of at least one state participant of the contract. The contract is associated with a pre-determined number of participants. As an example and referring to FIG. 6, the message receiving module 201 can receive a state transition message of a smart contract, where the state transition message includes signature data of a state participant of the smart contract. The state participant can be a participant in a smart contract that is able to confirm a state transition of the smart contract, for example, based on multi-signatures of smart contract state participants. The requested state transition can be, for example, a state transition from a pending state to a confirmed state, or a state transition from a confirmed state to a terminated state.

In some implementations, the request for transitioning the state of the contract includes a state transition message generated, through encryption processing, by a state participant of the at least one state participant. For example, the blockchain node in which the state participant is located can store a decryption key that corresponds to the encryption processing. The decryption key can be used for processing the request. From 702, method 700 proceeds to 704.

At 704, the signature data is verified at a blockchain node of the plurality of blockchain nodes of the blockchain system. The verification is based on at least one public key corresponding to the at least one state participant. As an example and again referring to FIG. 6, the signature verification module 202 can verify the signature data by using a public key of the state participant.

In some implementations, one of the public keys used during verification processing of the signature data can include a temporary key that is dynamically updated according to a predetermined rule and is received at the blockchain node where verification is performed. As an example, a predetermined rule can specify that the key is updated once per day or once per week. From 704, method 700 proceeds to 706.

At 706, a determination is made whether the signature data of the at least one state participant is verified. For example and still referring to FIG. 6, the state confirmation module 203 can determine that signature data of K state participants is verified, where K≥1, and a value of K is pre-determined in the smart contract. From 706, method 700 proceeds to 708.

At 708, in response to determining that the signature data of the at least one state participant is verified, a new contract state defined in the request is confirmed. The pre-determined number of participants is pre-determined in the contract. For example and referring to FIG. 6, if the state confirmation module 203 has determined that signature data of K state participants has been verified, then the state confirmation module 203 can confirm a smart contract state in the state transition message. In some implementations, confirming the new contract state can be performed by a dedicated blockchain node at the blockchain system.

In some implementations, confirming the new contract state can include verifying signatures associated with the at least one state participant. For example, after verifying the signatures associated with the at least one state participant, the state of the contract can be transitioned to the new contract state. The signatures can include the signature data of the at least one state participant provided for transitioning the state of the contract. The contract can include a plurality of participants, where a participant of the contract can be a state participant. After 708, method 700 can stop.

In some implementations, method 700 can further include the use of a symmetric algorithm or an asymmetric algorithm for generating the key. For example, a determination can be made whether transitioning the state of the contract relates to content information of the contract. In response to determining that transitioning is related to the content information of the contract, the state transition message of the contract can be encrypted by using a key of a state participant of the at least one state participant, where the state participant is a participant of the contract. In some implementations, the key can be generated by using a symmetric or an asymmetric algorithm, where the key includes a public key and a private key. State participants can include state participant that generate and send, to each other, public keys to verify content of the state transition message of the contract.

In some implementations, method 700 can further include determining a blockchain node from the plurality of blockchain nodes to perform the confirmation of the new contract state. For example and referring to FIG. 6, the state confirmation module 203 can determine the blockchain node (from blockchain nodes associated with the contract) based on a predetermined rule.

In some implementations, method 700 can further include broadcasting the new contract state into the blockchain system. For example and referring to FIG. 6, the state confirmation module 203 can broadcast the new state to nodes in the blockchain.

The present disclosure relates to blockchain data processing. A state transition message of a smart contract (that exists in a blockchain) is received. The requested state transition of the contract state can be, for example, a state transition from a pending state to a confirmed state, or a state transition from a confirmed state to a terminated state. The state transition message includes signature data of one or more state participants of the smart contract. The signature data is verified by using one or more public keys of the state participants. A smart contract state is confirmed in the state transition message if signature data of a predefined set of state participants is verified, where the number of state participants is pre-determined in the smart contract and may include some or all of the participants of the smart contract. A smart contract state can be confirmed based on multi-signatures of smart contract state participants. If the multi-signatures are verified, it can be confirmed that the state transition message of the smart contract is valid, and data processing for smart contract state transition can be performed. An advantage of the techniques described in the present disclosure is that a smart contract state can be confirmed by using signature verification of a pre-defined set of smart contract state participants. Processing time needed by the blockchain system for evaluation of transaction content can be reduced by confirmation of state transitions, where the confirmation is based on signature verification of predefined state participants. This also allows transitions of states of smart contracts to be performed more efficiently and reliably through the blockchain data processing method.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for processing blockchain data, comprising:
generating, by a first blockchain node computer of a plurality of blockchain node computers in a blockchain network, a private key of a first participant in a smart contract and a public key of the first participant in the smart contract, wherein the smart contract is in a first contract state;
receiving, by the first blockchain node computer and from a second blockchain node computer of the plurality of blockchain node computers, a public key of a second participant in the smart contract;

signing, by the first blockchain node computer and using the private key of the first participant, smart contract creation data comprising the smart contract, the public key of the first participant, and the public key of the second participant;

storing, by the first blockchain node computer, the smart contract creation data in a ledger of the blockchain network;

receiving, by the first blockchain node computer, a public key of a third participant in the smart contract;

receiving, by the first blockchain node computer and from a third blockchain node computer of the plurality of blockchain node computers, an encrypted state transition request to transition a state of the smart contract in the blockchain network, wherein the encrypted state transition request comprises signature data corresponding to the third participant, wherein the encrypted state transition request includes a second contract state for the smart contract;

accessing, by the first blockchain node computer, the smart contract on the ledger using the private key of the first participant;

decrypting, by the first blockchain node computer, the encrypted state transition request with the public key of the third participant;

verifying, by the first blockchain node computer, the signature data corresponding to the third participant, based on the public key of the third participant;

based on the verifying of the signature data corresponding to the third participant, confirming, by the first blockchain node computer, the second contract state;

transitioning, by the first blockchain node computer, the state of the smart contract to the second contract state; and broadcasting, by the first blockchain node computer, the second contract state to the plurality of blockchain node computers.

2. The computer-implemented method of claim 1, comprising:
in response to signing, by the first blockchain node computer and using the private key of the first participant, the smart contract creation data, generating, by the first blockchain node computer, a second private key of the first participant and a second public key of the first participant.

3. The computer-implemented method of claim 1, comprising:
subsequent to a passage of a key replacement time since generation of the private key of the first participant and generation of the public key of the first participant by the first blockchain node computer, generating, by the first blockchain node computer, a second private key of the first participant and a second public key of the first participant.

4. A non-transitory, computer-readable medium storing one or more instructions that, when executed by one or more processors of a first blockchain node computer of a plurality of blockchain node computers of a blockchain network, cause the one or more processors to perform operations comprising:
generating a private key of a first participant in a smart contract and a public key of the first participant in the smart contract, wherein the smart contract is in a first contract state;
receiving, from a second blockchain node computer of the plurality of blockchain node computers, a public key of a second participant in the smart contract;

signing, using the private key of the first participant, smart contract creation data comprising the smart contract, the public key of the first participant, and the public key of the second participant;

storing the smart contract creation data in a ledger of the blockchain network;

receiving a public key of a third participant in the smart contract;

receiving, from a third blockchain node computer of the plurality of blockchain node computers, an encrypted state transition request to transition a state of the smart contract in the blockchain network, wherein the encrypted state transition request comprises signature data corresponding to the third participant, wherein the encrypted state transition request includes a second contract state for the smart contract;

accessing the smart contract on the ledger using the private key of the first participant;

decrypting the encrypted state transition request with the public key of the third participant;

verifying the signature data corresponding to the third participant, based on the public key of the third participant;

based on the verifying of the signature data corresponding to the third participant, confirming the second contract state;

transitioning the state of the smart contract to the second contract state; and broadcasting the second contract state to the plurality of blockchain node computers.

5. The non-transitory, computer-readable medium of claim 4, wherein the operations comprise:
in response to signing, using the private key of the first participant, the smart contract creation data, generating a second private key of the first participant and a second public key of the first participant.

6. The non-transitory, computer-readable medium of claim 4, wherein the operations comprise:
subsequent to a passage of a key replacement time since generation of the private key of the first participant and generation of the public key of the first participant, generating a second private key of the first participant and a second public key of the first participant.

7. A computer-implemented system, comprising:
one or more processors of a first blockchain node computer of a plurality of blockchain node computers of a blockchain network; and
one or more computer memory devices interoperably coupled with the one or more processors and having tangible, non-transitory, machine-readable media storing one or more instructions that, when executed by the one or more processors, cause the one or more processors to perform one or more operations comprising:
generating a private key of a first participant in a smart contract and a public key of the first participant in the smart contract, wherein the smart contract is in a first contract state;
receiving, from a second blockchain node computer of the plurality of blockchain node computers, a public key of a second participant in the smart contract;
signing, using the private key of the first participant, smart contract creation data comprising the smart contract, the public key of the first participant, and the public key of the second participant;
storing the smart contract creation data in a ledger of the blockchain network;

receiving a public key of a third participant in the smart contract;

receiving, from a third blockchain node computer of the plurality of blockchain node computers, an encrypted state transition request to transition a state of the smart contract in the blockchain network, wherein the encrypted state transition request comprises signature data corresponding to the third participant, wherein the encrypted state transition request includes a second contract state for the smart contract;

accessing the smart contract on the ledger using the private key of the first participant;

decrypting the encrypted state transition request with the public key of the third participant;

verifying the signature data corresponding to the third participant, based on the public key of the third participant;

based on the verifying of the signature data corresponding to the third participant, confirming the second contract state;

transitioning the state of the smart contract to the second contract state; and broadcasting the second contract state to the plurality of blockchain node computers.

8. The computer-implemented system of claim 7, wherein the operations comprise:

in response to signing, using the private key of the first participant, the smart contract creation data, generating a second private key of the first participant and a second public key of the first participant.

9. The computer-implemented system of claim 7, wherein the operations comprise:

subsequent to a passage of a key replacement time since generation of the private key of the first participant and generation of the public key of the first participant, generating a second private key of the first participant and a second public key of the first participant.

\* \* \* \* \*